United States Patent [19]

Sowards

[11] Patent Number: 5,450,675

[45] Date of Patent: Sep. 19, 1995

[54] METHOD AND APPARATUS FOR VERTICALLY ALIGNING A STRUCTURE

[75] Inventor: Jeff R. Sowards, Vinton, Ohio

[73] Assignee: Bashlin Industries, Inc., Grove City, Pa.

[21] Appl. No.: 300,739

[22] Filed: Sep. 2, 1994

[51] Int. Cl.[6] .................. G01C 1/00; G01C 9/02
[52] U.S. Cl. ...................... 33/282; 33/283; 33/290; 33/370
[58] Field of Search .................. 33/281, 282, 283, 286, 33/290, 291, 293, 295, 370, 371, 372, 373, 379, 404, 406, 407

[56] References Cited

U.S. PATENT DOCUMENTS

| | | | |
|---|---|---|---|
| 49,675 | 8/1865 | Chase | 33/282 |
| 79,582 | 7/1868 | Loomis | 33/290 |
| D. 304,237 | 8/1984 | Ray | 33/290 |
| 338,791 | 3/1986 | Smith | 33/290 |
| 365,033 | 6/1987 | Wood | 33/290 |
| 778,508 | 12/1904 | Sandbrook | 33/290 |
| 1,012,740 | 12/1911 | Stamps | 33/290 |
| 1,041,622 | 10/1912 | Guilfoyle | 33/290 |
| 1,256,737 | 2/1918 | Small | 33/379 |
| 1,501,814 | 7/1924 | Scofield | 33/370 |
| 1,709,310 | 4/1929 | Dahl | 33/290 |
| 2,877,561 | 3/1959 | Morse | 33/370 |

Primary Examiner—William A. Cuchlinski, Jr.
Assistant Examiner—G. Bradley Bennett
Attorney, Agent, or Firm—Buchanan Ingersoll; Lynn J. Alstadt

[57] ABSTRACT

A method and apparatus for vertically aligning a structure. The vertical alignment device has a main body with a front face, a back surface, two side surfaces, and a top reflective surface with an edge and a cross hair extending from the edge; a planar member having a cross hair and being attached to the top surface; and horizontal level. The method of vertically aligning a structure substantially comprises the steps of positioning the vertical alignment device against the structure to be vertically aligned, moving the alignment device such that the top surface cross hair is in alignment with the planar member cross hair when looking into the top reflective surface, manipulating the structure such that both the top surface cross hair and the planar member cross hair are in alignment with the center line of the structure when looking into the top reflective surface, and positioning the main body such that the level indicates that the main body is horizontally level.

20 Claims, 3 Drawing Sheets

METHOD AND APPARATUS FOR VERTICALLY ALIGNING A STRUCTURE

FIELD OF THE INVENTION

This invention relates to a method and apparatus for vertically aligning a structure without referencing a known vertically aligned object. When in use, the vertical alignment apparatus is positioned against the structure being aligned and is compact enough that it can be held in the user's hand.

BACKGROUND OF THE INVENTION

In building construction and many other situations it is necessary to position structural elements along a true vertical axis. Many types of devices for vertically aligning structural elements are well known. One type of vertical alignment device is positioned on a horizontal surface at a distance from the structure being vertically aligned. This type of vertical alignment device typically has two cross hairs positioned across a sight passageway which extends through the length of the alignment device. The cross hairs perpendicularly intersect one another such that a true vertical line is established which is then used as a reference to align the structure. In order for the structure to be aligned with a true vertical, the structure must be aligned in both the x-y plane and the z-y plane. When the structure is vertically aligned in one plane, the alignment device must be moved ninety degrees (90°) relative to the initial position of the alignment device in order to vertically align the structure in the other plane. Examples of this type of alignment device are described in U.S. Pat. No. 304,237 to Ray; U.S. Pat. No. 338,791 to Smith; U.S. Pat. No. 1,012,740 to Stamps; and U.S. Pat. No. 1,709,310 to Dahl. Because this type of alignment device must be positioned at a distance from the structure being aligned, it may be necessary to located the alignment device on the edge of a large highway, or the bank of a river creating a dangerous situation. Further, it is very time consuming to vertically align a structure in the x-y plane, move the alignment device ninety degrees (90°), and then vertically align the structure in the z-y plane.

Another type of conventional alignment device is attached directly to the structure being aligned and a known horizontally aligned object at a distance from the structure is used as a reference to horizontally align the structure. An example of this type of alignment device is described in U.S. Pat. No. 1,041,622 to Guilfoyle. Guilfoyle discloses a horizontal leveling device having a bubble tube, and a cross hair positioned on both the inlet and outlet of a sight passageway. The alignment device is attached to a railroad track being horizontally aligned. The railroad track is moved to a position so that the bubble tube indicates the railway track is in horizontal alignment with the reference object positioned at a distance from the railroad track. The reference object can be a railway platform or any other object known to have a true horizontal line. The drawback of this type of alignment device is that it requires a reference object positioned at a distance from and in a direct line of sight of the alignment device. As noted above, it can be inconvenient or impossible to establish a direct line of sight between the reference object and the structure being aligned.

A conventional plumb bob can also be used to vertically align a structural element. Generally, a plumb bob comprises a weight attached to one end of a line. The end of the line opposite the weight is held or hung from an object such that the weight hangs free and the line defines a true vertical. The line is used as a reference and the structure being aligned is moved into alignment with the plumb bob line. The problem with the conventional plumb bob is that the plumb bob can not be used in strong winds. If the wind is strong enough to move the weight, the line will not be at a true vertical and the user will have to wait until the wind dies down. Further, the plumb bob must be either hung from an object or held by a person. If the plumb bob is held by a person, another person is usually needed to align the structure with the line of the plumb bob. Alternatively, it may be impossible or inconvenient to find an object from which to hang the plumb bob.

Yet another prior art device which can be used to both horizontally and vertically align an object is a traditional level. A level usually takes the form of a three-dimensional, rectangular body having at least two bubble tubes positioned at a right angle with respect to one another. When vertically aligning a structural element, one side of the rectangular level is positioned in contact with one side of the structure being vertically aligned. The structure is then moved to a position so that one of the bubble tubes indicates the structure is aligned with a true vertical. The drawback with this type of device is that the surfaces of the structure being aligned may not be straight edges resulting in the structure being inaccurately aligned.

All of the prior art mentioned do not provide a hand held vertical alignment device which can be used in severe weather to align a structure having uneven or roughened surface and which in use, is positioned against the structure being vertically aligned and does not necessitate the use of a reference object. Therefore, there is a need for an accurate, compact vertical alignment device which can be used in severe weather and in use, is positioned in contact with the structure being vertically aligned where the structure can have uneven and roughened surfaces.

SUMMARY OF THE INVENTION

I provide a method and apparatus for vertically aligning a structure where the apparatus is in a position contacting the structure while the structure is being vertically aligned. The apparatus substantially comprises a main body having a front face, a back surface, at least two side surfaces, a top reflective surface with a mating edge formed where the top surface and the back surface meet and a cross hair extending from the edge; a transparent planar member having a cross hair and being attached to the top reflective surface at the mating edge; and a horizontal level located on the front face of the main body.

I further provide that the top surface can be inclined at an angle equal to or greater than approximately forty-five degrees (45°) relative to the back surface. The planar member can be positioned at an angle of approximately ninety degrees (90°) or less with respect to the top surface. Preferably, the top surface is inclined at approximately sixty degrees (60°) relative to the back surface and the planar member is positioned at approximately forty-five degrees (45°) with respect to the top surface. A prop or a similar structure can maintain the planar member in an open position at a desired angle relative to the top surface.

I prefer that both the top surface cross hair and the planar member cross hair are positioned perpendicular with respect to the mating edge. Alternatively, both cross hairs can be positioned at an angle relative to a line perpendicular to the mating edge in order that the structure can be vertically aligned at the same angle relative to a true vertical.

I prefer that my apparatus be sized such that the apparatus is able to be held in the hand of a user while vertically aligning a structure. Preferably, the lower portion of the main body is smaller than the upper portion of the main body. A handle portion having a gripping surface portion may be provided on the main body.

My vertical alignment device can be provided with a fastening device allowing the alignment device to be retained on the structure while the structure is being vertically aligned. The fastening device can be a belt with "VELCRO" fastening tape on each end. Alternatively, suction cups can be provided on the main body back surface to retain the vertical alignment device on the structure while the structure is being aligned.

I further provide a method for vertically aligning a structural element using my vertical alignment device substantially comprising the steps of positioning the main body back surface against the structure being aligned, moving the alignment device such that the planar member cross hair is in alignment with the top reflective surface cross hair when looking into the top reflective surface, manipulating the structure such that the structure center line is in alignment with both the planar member cross hair and the top reflective surface cross hair when looking into the top reflective surface, and maneuvering the main body such that the horizontal level indicates that the main body is horizontally level.

In accordance with another aspect of my method, a structural element can be vertically aligned with a true vertical line by using vertical alignment device to vertically align the structure in both the x-y plane and the z-y plane.

Yet another aspect of my method provides for a structural element to be vertically aligned at an angle with respect to the vertical where the desired angle is equal to the angle at which both the planar member cross hair and the top surface cross hair are positioned relative to a line perpendicular to the mating edge.

My method and apparatus for vertically aligning structures are particularly useful to vertically align structures which support utility wires and structural elements in the construction industry.

Additional details, objects, and advantages of the invention will become more readily apparent as the following description of certain present preferred embodiments and methods thereof proceed.

BRIEF DESCRIPTION OF THE DRAWINGS

The accompanied drawings show a present preferred embodiment of my vertical alignment device in which.

DETAILED DESCRIPTION OF THE PRESENT PREFERRED EMBODIMENTS AND METHODS

Figure 1:
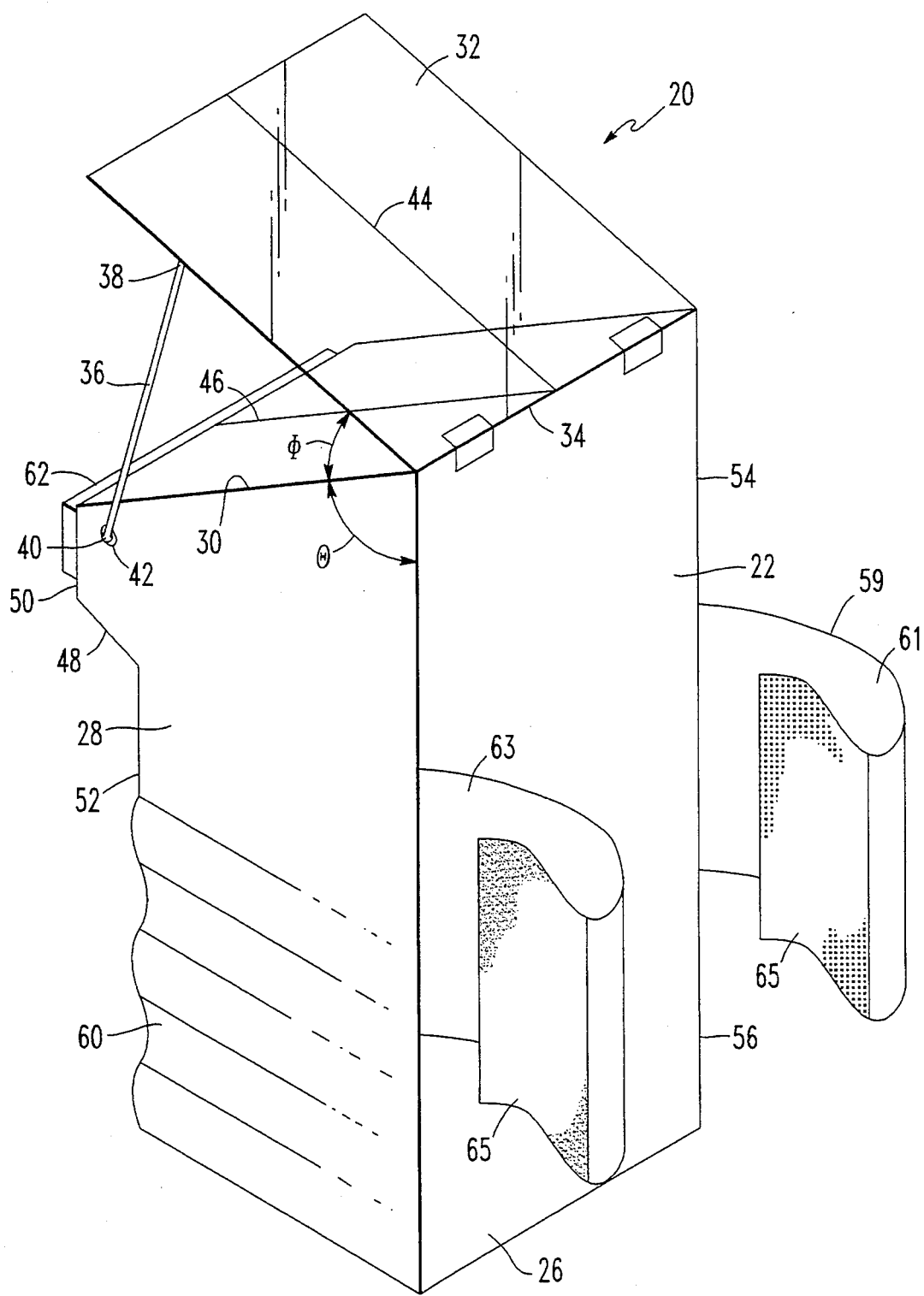
FIG. 1 is a rear perspective view of my vertical alignment device with optional fastening device.
Figure 2:
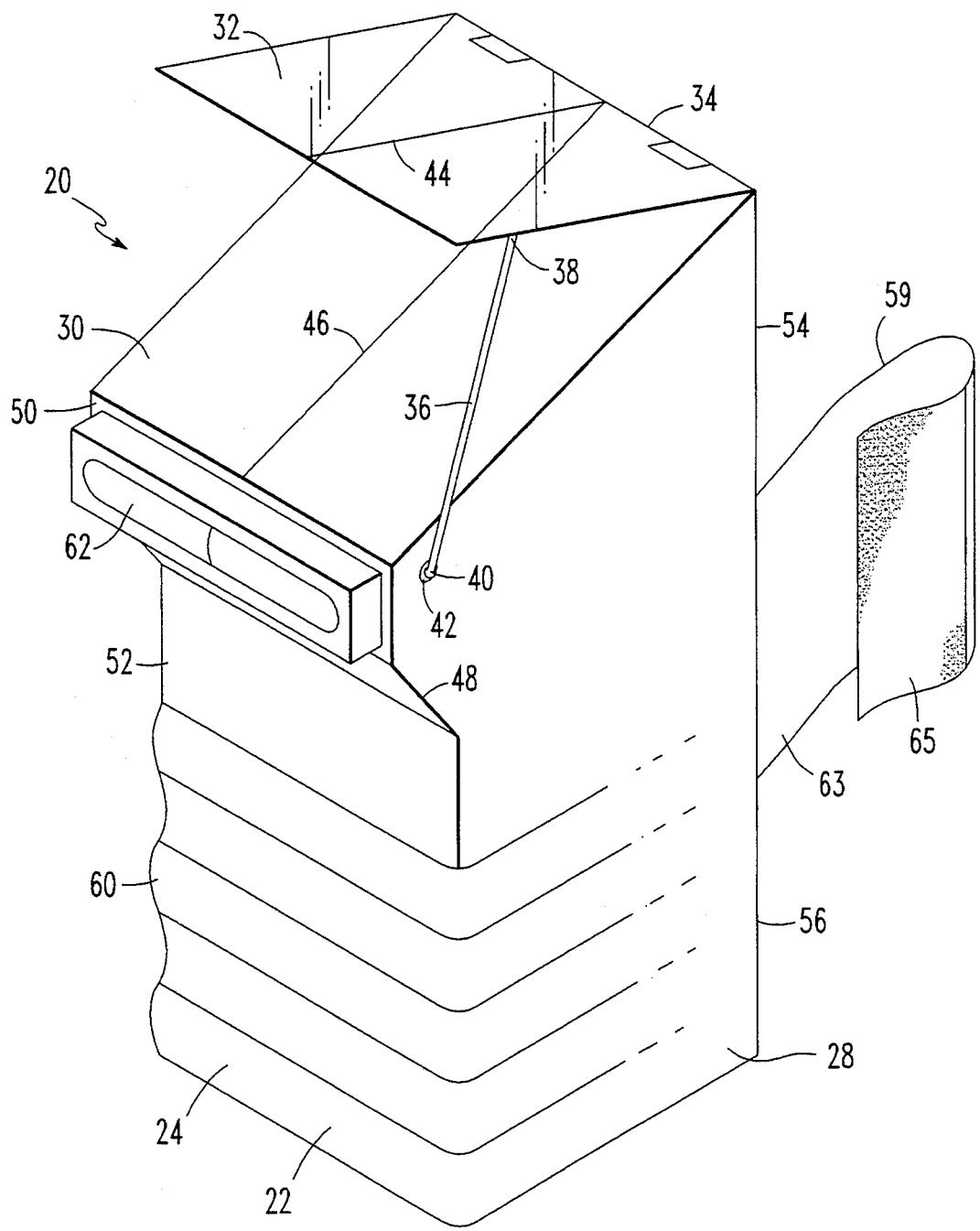
FIG. 2 is a front perspective view of my vertical alignment device shown in FIG. 1.

As shown in FIGS. 1 and 2, a present preferred embodiment of my vertical alignment device 20 substantially comprises a main body 22 having a front face 24, a back surface 26, two side surfaces 28, a top reflective surface 30 with an edge 34 formed where the top surface 30 and the back surface 26 meet, a bottom surface (not shown); and a transparent planar member 32. The front face 24, the back surface 26, the bottom surface, and the two sides surfaces 28 substantially meet at right angles to form a box-like structure. The top surface 30 is inclined at an angle $\Theta$ relative to the back surface 26. Although angle $\Theta$ can be equal to or greater than approximately forty-five degrees (45°), it is preferred that top surface 30 be inclined at an angle $\Theta$ equal to approximately sixty degrees (60°). Top surface 30 is a reflective surface which is preferably a glass mirror. A cross hair 46 bisects top surface 30 through its center dividing top surface 30 into two equal rectangular sections. Cross hair 46 is perpendicular to mating edge 34.

Front face 24 has a beveled portion 48 which is positioned between upper front portion 50 and lower front portion 52. Beveled surface 48 divides main body 22 into two substantially rectangular portions 54 and 56. Main body upper rectangular portion 54 is preferably larger in cross-section than main body lower rectangular portion 56. Lower rectangular portion 56 forms a handle portion having a gripping surface 60. Although gripping surface 60 is shown on front face 24 and both side surfaces 28, gripping surface 60 can be placed on only one or any combination of the two side surfaces 28, the front face 24, or the back surface 26. Further, gripping surface 60 can take the form of detents or any other structure which facilitates the handling of the vertical alignment device 20. Main body 22 also can be formed without handle portion 60 or with a separate handle extending from main body 22.

A fastening element in the form of a belt 59 having a first strap 61 and a second strap 63 extends from the main body 22. The fastening element retains alignment device 20 on the structure being aligned eliminating the need for a person to hold the alignment device 20 against the structure while a second person moves the structure into vertical alignment. Both straps 61 and 63 are shown having "VELCRO" fastening tape 65 on their ends such that the belt 59 can be wrapped around a structure and the straps 61 and 63 can be connected. Other fastening elements can be substituted for belt 59 such as suction cups (not shown) placed on the back surface 26.

Planar member 32 is hingeably attached along the mating edge 34. Planar member 32 is held in an open position by prop 36 as shown in both FIGS. 1 and 2. Instead of relying on prop 36 to retain the planar member 32 in the open position, one could also use a stop lock or other arrangement which will prevent the planar member 32 from moving from the desired open position. In the open position planar member 32 is positioned at an angle $\Phi$ relative to the top surface 30 which can be less than or equal to ninety degrees (90°), but preferably angle $\Phi$ is approximately forty-five degrees (45°). The prop 36 has a first end 38 and a second end 40. Prop second end 40 is pivotably connected to side surface 28 at plug 42. Planar member 32 is made from a transparent material and has a vertical cross hair 44 which is perpendicular to the mating edge 34 and meets cross hair 46 at a point along the mating edge 34. Preferably cross hair 44 bisects planar member 32 through its center dividing planar member 32 into two equal rectangular sections. Planar member 32 can be made from any transparent material but is preferably made from plexiglas.

Horizontal level 62 is mounted on upper front surface 50. Although horizontal level 62 is illustrated as a bubble tube, it can take the form of a string level or any equivalent thereof. Further, the horizontal level 62 can be placed on any portion of the front face 24 but should be parallel with both the back surface 26 and the bottom surface.

Figure 3:
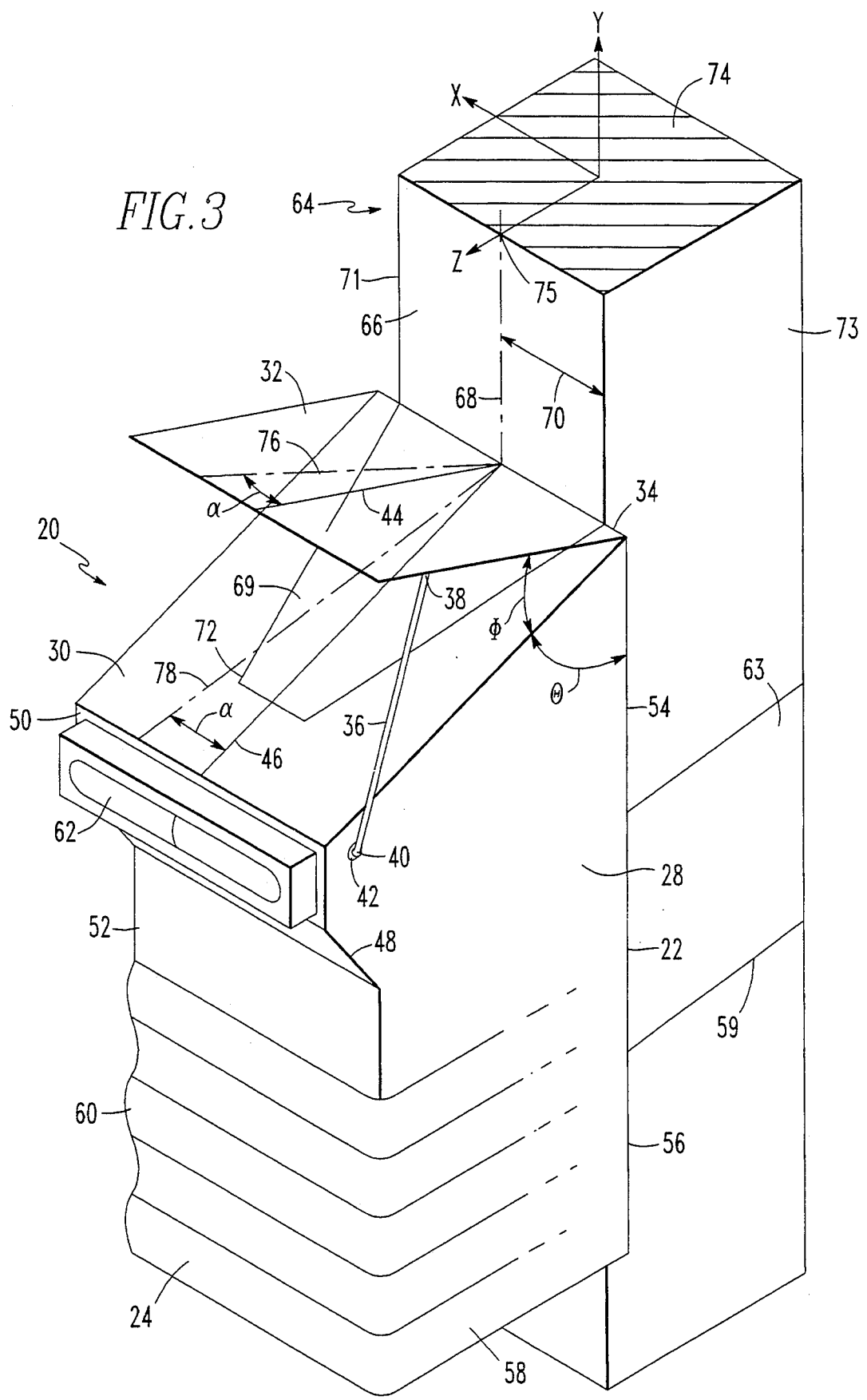
FIG. 3 is a front perspective view of my vertical alignment device attached to a structure being vertically aligned and having optional cross hairs illustrated in hidden lines.

FIG. 3 illustrates my vertical alignment device 20 being used to vertically align structure 64 in the x-y plane. The back surface 26 (shown in FIG. 1) of the main body 22 is initially positioned in contact with side 66 of the structure 64. Strap 61 (shown in FIG. 1) and strap 63 are wrapped around the structure 64 and connected such that vertical alignment device 20 is retained on structure 64 by belt 59. Planar member 32 is then lifted at an angle Φ of forty-five degrees (45°) relative to top reflective surface 30. Prop 36 is positioned under planar member 32 to retain planar member 32 in an open position. Looking into top reflective surface 30, the alignment device 20 is tilted as necessary so that planar member cross hair 44 is aligned with top surface cross hair 46. Structure 64 is then positioned so that both planar member cross hair 44 and top surface cross hair 46 are aligned with the center line 68 of structure 64 when the user is looking into top reflective surface 30. The center line 68 of the structure 64 is aligned with both the cross hairs 44 and 46 when half of the reflection 69 of the structure 64 appears on each side of cross hair 46 in top surface 30. Because structures which are far away look smaller in mirrors, most structures will be seen in top reflective surface 30 even though the structure may be wider than the alignment device 20. For a more precise vertical alignment of the structure, the center line 68 of the structure 64 may be marked on the structure 64 prior to vertically aligning the structure 64. The center line 68 of the structure 64 is identified by first measuring the width of the structure 64, calculating an amount equal to half the width of the structure 64, measuring the calculated amount perpendicularly from the edge 71 of the structure 64, and marking the center line 68 directly on the structure 64.

After the center line 68 is identified and aligned with both cross hairs 44 and 46, alignment device 20 is then manipulated such that horizontal level 62 indicates that the alignment device 20 is horizontally level. If after alignment device 20 is horizontally level, the center line 68 of structure 64 is no longer aligned with both cross hairs 44 and 46, the structure 64 must be repositioned in order that center line 68 is aligned with cross hairs 44 and 46 when looking into top reflective surface 30 and the bubble tube indicates that the alignment device 20 is horizontally level.

In order to align structure 64 with a true vertical line, the above-described process must be repeated to vertically align the structure in the z-y plane. The alignment device must be positioned at ninety degrees (90°) relative to the initial position of the alignment device 20. The back surface 26 of the main body 22 could be positioned against side 73 of the structure 64 which is adjacent to side 66 of the structure 64.

My apparatus can be used to align structure 64 at an angle relative to the true vertical, i.e., a rake. First the structure 64 is aligned with a true vertical in the x-y plane as described above. Typically, a rake is defined in terms of an offset length. The offset length is equal to the distance from the top 75 of the center line 68 of the structure 64 to a point where the top 75 of the center line 68 would be if the structure 64 was positioned at the desired rake. A proportion is then calculated equal to the offset length divided by the width of the structure 64 being vertically aligned. Finally, the structure 68 is tilted in the direction of the desired rake such that the top 75 of the center line 68 of the structure 64 is moved the calculated proportion as seen in the top reflective surface 30. For example, if the width of the structure 64 is twelve inches (12") and the desired offset length is six inches (6"), the calculated proportion is one-half. Top end 74 of the structure 64 should be tilted from the vertical until edge 72 of the reflection 69 is touching both cross hairs 44 and 46 when looking into the top reflective surface 30. In other words, one-half of structure 64 should be moved in the direction of the desired rake resulting in all of the reflection 69 of the structure top end 74 being on one side of the cross hairs 44 and 46 when looking into the top reflective surface 30.

Alternatively, by drawing cross hairs 76 and 78 (shown in chain lines in FIG. 3) at an angle α relative to a line perpendicular to edge 34 wherein angle α is equal to the desired rake, my apparatus could be used to position a structure at the desired rake. First back surface 26 is positioned in contact with side 66 of the structure 64. Planar member 32 is lifted and retained by prop 36 at an angle Φ of forty-five degrees (45°) with respect to top reflective surface 30. Alignment device 20 is tilted as necessary so that planar member cross hair 76 is aligned with top surface cross hair 78 when the user is looking into top reflective surface 30. Structure 64 is then manipulated so that both planar member cross hair 76 and top surface cross hair 78 are aligned with the center line 68 of structure 64 when looking into top reflective surface 30. Alignment device 20 is then positioned such that horizontal level 62 indicates that the alignment device 20 is horizontally level. When the structure 64 is aligned at the desired rake, the main body 22 may be repositioned such that the back surface 26 is ninety degrees (90°) relative to the initial position and in contact with side 73 of the structure 64 in order to vertically align structure 64 as desired in the z-y plane.

Although main body 22 is illustrated as being rectangular, main body 22 can be other shapes such as hexagonal and octagonal. Also I prefer to form main body 22 from a plastic. However, other materials can be used.

In general my present preferred methods and apparatus can be used to vertically align any structure regardless of surface roughness, taper, cross-sectional shape and length. My present preferred methods and apparatus can be used to vertically align wood, concrete, or steel structures which support utility wires and to plumb studs and other structural elements in the construction industry.

Although I have illustrated and described present preferred embodiments and methods for vertically aligning structures, it should be distinctly understood that my invention is not limited thereto but may be variously embodied within the scope of the following claims.

I claim:
1. A vertical alignment device comprising:
(a) a main body having a front face, a back surface, at least two side surfaces, a top reflective surface with an edge formed where the top reflective surface and the back surface meet and a cross hair on the top reflective surface extending from the edge;

(b) a horizontal level positioned on the front face; and (c) a transparent planar member having a cross hair and being attached to the main body along the edge such that the top surface cross hair and the planar member cross hair meet at a point along the edge and the planar member can be positioned at a selected angle relative to the top surface.

2. The vertical alignment device of claim 1 wherein the top reflective surface is at an angle $\theta$ of between approximately forty-five degrees (45°) and approximately ninety degrees (90°) relative to the back surface and the planar member is at an angle $\Phi$ of between approximately ten degrees (10°) and approximately ninety degrees (90°) with respect to the top reflective surface.

3. The vertical alignment device of claim 2 wherein the top reflective surface is inclined at approximately sixty degrees (60°) relative to the back surface and the planar member is at approximately forty-five degrees (45°) with respect to the top reflective surface.

4. The vertical alignment device of claim 1 wherein both the planar member cross hair and the top surface cross hair are positioned substantially perpendicular to the edge.

5. The vertical alignment device of claim 1 wherein the planar member is plexiglas.

6. The vertical alignment device of claim 1 wherein the top surface is a glass mirror.

7. The vertical alignment device of claim 1 wherein the horizontal level is a bubble tube.

8. The vertical alignment device of claim 1 further comprising an elongated prop having a first end and a second end wherein the second end is pivotably attached to the main body and the prop retains the planar member at the selected angle relative to the top reflective surface.

9. The vertical alignment device of claim 1 further comprising a handle portion.

10. The vertical alignment device of claim 9 wherein the handle portion has a gripping surface portion.

11. The vertical alignment device of claim 1 wherein both the planar member cross hair and the top surface cross hair are positioned at an angle $\alpha$ with respect to a line perpendicular to the edge wherein the angle $\alpha$ is equal to a desired rake at which the structure is to be aligned.

12. The vertical alignment device of claim 1 further comprising a fastening element on the main body which retains the alignment device on the structure while the structure is being vertically aligned.

13. The vertical alignment device of claim 1 further comprising a bottom surface wherein the at least two side surfaces, the front surface, the back surface, and the bottom surface substantially meet at right angles to form a box-like structure.

14. The vertical alignment device of claim 13 wherein the horizontal level is parallel to both the back surface and the bottom surface.

15. A method for vertically aligning a structure using a vertical alignment device, the structure having a center line and a width, the vertical alignment device substantially comprises (i) a main body with a front face, a back surface, at least two side surfaces, a top reflective surface with an edge formed where the top reflective surface and the back surface meet and a cross hair on the top surface extending from the edge; (ii) a horizontal level positioned on the front face; and (iii) a transparent planar member having a cross hair and being attached to the main body along the edge such that the top surface cross hair and the planar member cross hair meet at a point along the edge, the planar member being at a selected angle with respect to the top surface, the method comprising the steps of:

(a) moving the main body to an initial position where the back surface is in contact with the structure;

(b) manipulating the alignment device such that the planar member cross hair is in alignment with the top surface cross hair when looking into the top reflective surface;

(c) positioning the structure such that the center line is in alignment with both the planar member cross hair and the top surface cross hair when looking into the top reflective surface; and (d) positioning the main body such that the horizontal level indicates that the main body is horizontally level.

16. The method of claim 15 wherein the planar member is at between approximately ten degrees (10°) and approximately ninety degrees (90°) relative to the top surface.

17. The method of claim 16 wherein the planar member is at forty-five degrees (45°) relative to the top surface.

18. The method of claim 15 further comprising the step of repeating steps (b) through (d) after repositioning the vertical alignment device at ninety degrees (90°) within the horizontal plane relative to the initial position and in contact with the structure being aligned.

19. The method of claim 15 further comprising the steps of:

(a) measuring the width of the structure;

(b) calculating a proportion equal to a desired offset length divided by the width of the structure; and (c) moving the structure in a direction of the desired offset until a reflection of the structure seen in the top reflective surface indicates that the structure has moved the calculated proportion.

20. The method of claim 15 further comprising the initial steps of marking the center line of the structure on the structure in order that the marking identifying the center line can be used in the step of positioning the structure such that the center line is in alignment with both the planar member cross hair and the top surface cross hair when looking into the top reflective surface.

* * * * *